United States Patent
Lendaro

(10) Patent No.: US 10,732,030 B2
(45) Date of Patent: Aug. 4, 2020

(54) LED END OF LIFE OPTICAL COMPARATOR AND METHODS FOR DETERMINING LED LIGHT FIXTURE END OF LIFE

(71) Applicant: Astronics Corporation, East Aurora, NY (US)

(72) Inventor: Jeffery Basil Lendaro, Grantham, NH (US)

(73) Assignee: Astronics Corporation, East Aurora, NY (US)

( * ) Notice: Subject to any disclaimer, the term of this patent is extended or adjusted under 35 U.S.C. 154(b) by 0 days.

(21) Appl. No.: 14/900,780

(22) PCT Filed: Jun. 30, 2014

(86) PCT No.: PCT/US2014/044966
§ 371 (c)(1),
(2) Date: Dec. 22, 2015

(87) PCT Pub. No.: WO2014/210615
PCT Pub. Date: Dec. 31, 2014

(65) Prior Publication Data
US 2016/0153832 A1      Jun. 2, 2016

Related U.S. Application Data

(60) Provisional application No. 61/840,895, filed on Jun. 28, 2013.

(51) Int. Cl.
*G01J 1/16*     (2006.01)
*G01J 1/44*     (2006.01)
(Continued)

(52) U.S. Cl.
CPC . *G01J 1/16* (2013.01); *G01J 1/44* (2013.01); *G01J 3/505* (2013.01); *H05B 45/58* (2020.01);
(Continued)

(58) Field of Classification Search
CPC ........ G01J 1/18; G01J 1/16; G01J 1/44; G01J 1/42; G01J 3/505; G01J 2001/4252;
(Continued)

(56) References Cited

U.S. PATENT DOCUMENTS

| | | | |
|---|---|---|---|
| 2011/0299068 A1* | 12/2011 | Glandt | G01J 1/18 356/218 |
| 2012/0098432 A1 | 4/2012 | Recker et al. | |

(Continued)

OTHER PUBLICATIONS

LED Luminaire Lifetime: Recommendations for Testing and Reporting, Solid-State Lighting Product Quality Initiative, Second Edition (online), Next Generation Lighting Industry Alliance with the U.S. Department of Energy, Jun. 2011, pp. 1-30. http://apps1.eere.energy.gov/buildings/publications/pdfs/ssl/led_luminaire-lifetime-guide_june2011.pdf.

(Continued)

*Primary Examiner* — Jamil Ahmed
(74) *Attorney, Agent, or Firm* — Hodgson Russ LLP

(57) ABSTRACT

The present invention provides methods and devices for determining end of life of a light fixture by comparing the light output of a control LED of the fixture with the light output of an illumination LED of the fixture. The control LED is energized for a short period of time for the purpose of measuring its light output. The illumination LED is energized for the duration of time of the light fixture itself. In this way, the amount of degradation of the illumination LED can be determined by comparison with the control LED. If the light output of the illumination LED falls below a threshold level, actions may be take, such as, for example, sounding an alarm.

18 Claims, 6 Drawing Sheets

(51) Int. Cl.
  *G01J 3/50* (2006.01)
  *H05B 45/58* (2020.01)
  *G01J 1/42* (2006.01)

(52) U.S. Cl.
  CPC .............. *G01J 2001/4252* (2013.01); *G01N 2201/0623* (2013.01)

(58) Field of Classification Search
  CPC ........ G01N 2201/0623; H05B 33/0893; H05B 33/0869; H05B 37/02; B64D 47/02
  See application file for complete search history.

(56) References Cited

U.S. PATENT DOCUMENTS

| | | |
|---|---|---|
| 2012/0194816 A1 | 8/2012 | Hempson et al. |
| 2013/0009551 A1* | 1/2013 | Knapp ............... H05B 33/0869 315/152 |
| 2013/0088148 A1 | 4/2013 | Hessling et al. |
| 2013/0154476 A1* | 6/2013 | Hessling ............ H05B 33/0893 315/77 |

OTHER PUBLICATIONS

LM-79 and LM-80, Technical Report (online), B-K Lighting, Teka Illumination, Nov. 30, 2009, pp. 1-2. http://www.bklighting.com/cimages/nw-339.pdf.

* cited by examiner

LED END OF LIFE OPTICAL COMPARATOR AND METHODS FOR DETERMINING LED LIGHT FIXTURE END OF LIFE

CROSS-REFERENCE TO RELATED APPLICATIONS

This application claims priority to U.S. Provisional Application No. 61/840,895, filed on Jun. 28, 2013, the disclosure of which is incorporated herein by reference.

FIELD OF THE INVENTION

The disclosure relates to lighting fixtures, and more particularly to methods and systems for determining end of life of a lighting fixture.

BACKGROUND OF THE INVENTION

Governmental agencies administer requirements with respect to the lighting requirements of an aircraft. For example, the U.S. Federal Aviation Administration ("FAA") requires certain minimum lighting requirements including locations of lights, color, and visibility (corresponding to light output).

Light-emitting diodes ("LEDs") are advantageously used to provide lighting because LEDs are energy efficient relative to previous technologies, and because, as solid-state devices, LEDs have long lifetimes compared with other technologies. LED light fixtures have become common in aviation lighting applications, such as navigation lights, beacons, landing lights, etc. However, over the long lifespan of a typical LED, its light output will degrade in an manner that is difficult or impossible to predict, rather than simply "burning out"—as was the case with previous, incandescent bulb and flashtube lights.

Due to this unpredictable degradation, aircraft lighting manufacturers have had difficulty providing a way to determine when a light fixture no longer meets the FAA specifications and needs replacement (the "end of life" or "EOL" of the fixture). One approach used in the industry for determining light fixture replacement is to designate a fixed end of life based upon a predetermined number of operating hours. However, if the light output of the fixture has dropped significantly below the specified value before the predetermine number of hours, then the fixture may be operating past its end of life. Conversely, if the light output is still significantly above the specified value at the predetermined number of hours, then the end of life determination may be premature.

Several other known methods use software approaches to make this determination. However, the use of software complicates aircraft-related certification.

There is a need for a way to more effectively determine when an aircraft light fixture is non-compliant with the FAA and other requirements.

BRIEF SUMMARY OF THE INVENTION

The present invention provides methods and devices for determining end of life of a light fixture by comparing the light output of a control LED of the fixture with the light output of an illumination LED of the fixture. The control LED is energized for a short period of time for the purpose of measuring its light output. The illumination LED is energized for the duration of time of the light fixture itself. In this way, the amount of degradation of the illumination LED can be determined by comparison with the control LED. If the light output of the illumination LED falls below a threshold level, actions may be take, such as, for example, sounding an alarm.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 1:
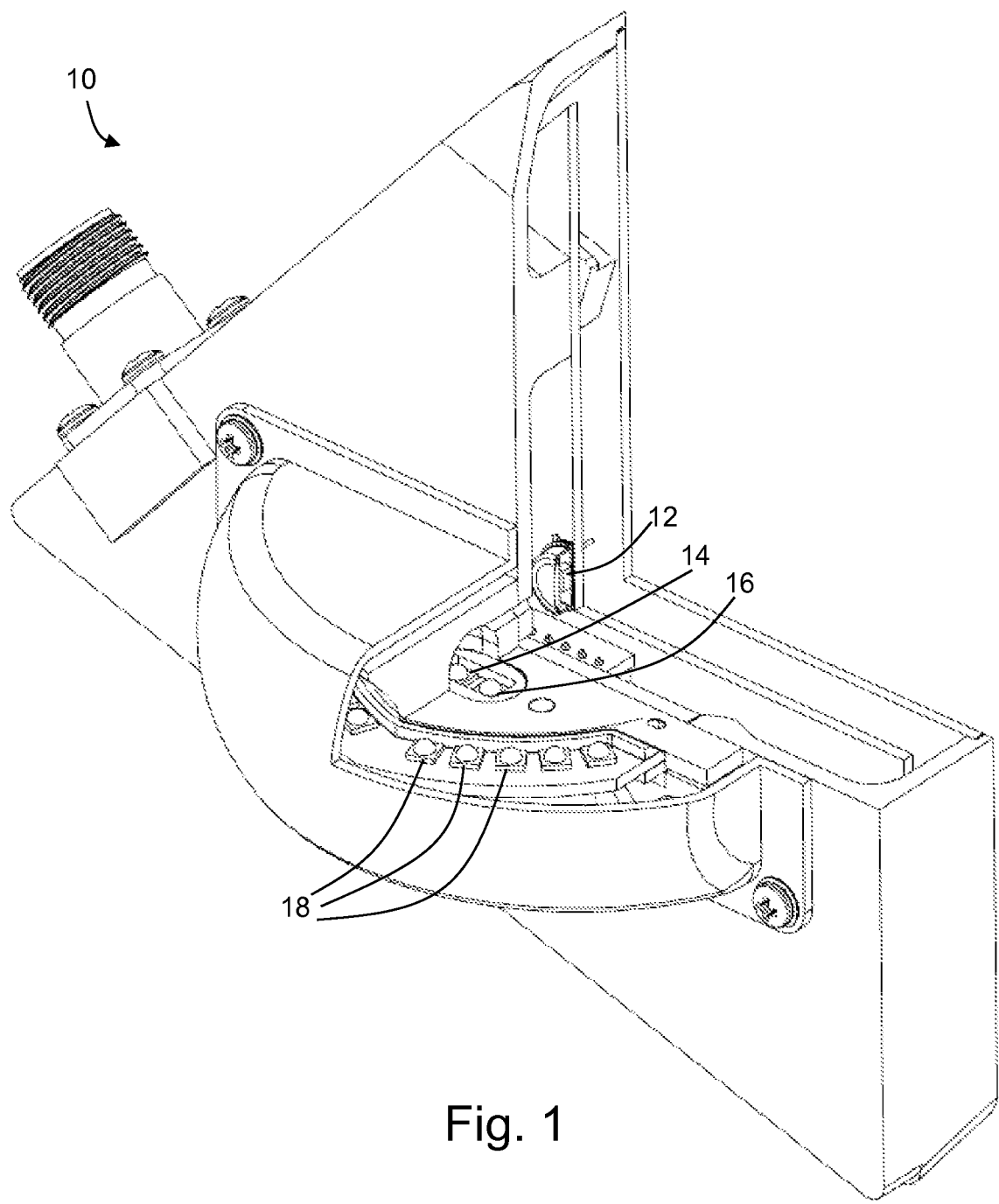
FIG. 1 is a perspective view of a light fixture showing an embodiment of the present invention.
Figure 2:
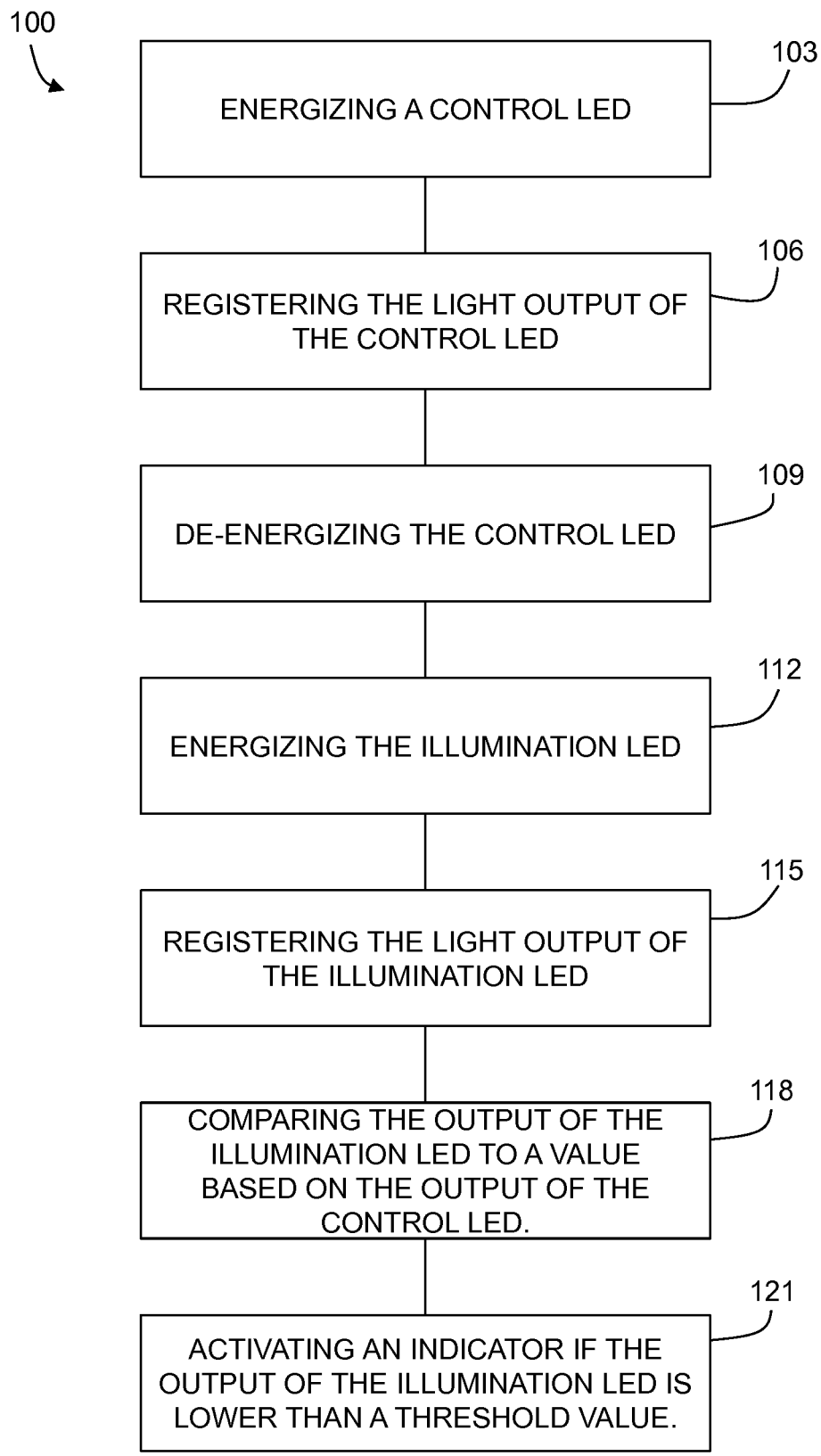
FIG. 2 is a flowchart of a method according to another embodiment of the present invention.

The present invention may be embodied as a method 100 for determining end of life ("EOL") of a light fixture, for example, an LED light fixture (the present disclosure may be used with other light technologies, especially those which have output degradation over the lifespan). The method 100 comprises energizing 103 a control LED. The control LED is an LED in the light fixture which is operated for a short period of time relative to the operation of other LEDs in the light fixture. As such, the degradation of the control LED may be assumed to be negligible because it is operated for a relatively small total of number of hours. Once the control LED is energized 103, a sensor is used to register 106 the light output of the control LED. The sensor may be, for example, a photo-diode. The sensor is configured to detect (for example, to measure) the light output of the control LED.

The light output of an LED may vary upon start-up of the LED, leveling off once the LED has stabilized. To account for this start-up variability, the control LED may be energized 103 for a predetermined period of time before registration 106. The predetermined period of time may be selected to be sufficient to account for all, or substantially all, of the start-up variability. In another embodiment, the step of registering 106 the light output of the control LED comprises the sub-step of repeatedly registering the light output of the control LED and integrating and/or averaging the registered value. In some embodiments, the repeated measurements are used to determine when the light output has stabilized after start-up. The method 100 comprises the step of de-energizing 109 the control LED.

An illumination LED of the light fixture is energized 112. The illumination LED may be an LED used to provide functional light according to the purpose of the light fixture. In other embodiments, the illumination LED is an LED that is used primarily for end of life determination. In either case, the illumination LED operates for substantially the same length of time as any other LEDs of the light fixture that are used to provide functional light. The light output of the illumination LED is registered 115 using the sensor. It should be noted that steps of the disclosed methods do not necessitate a particular order. For example, the control LED and illumination LED may both be energized at a given time, and the sensor may be configured to register each in isolation (for example, by using an opaque shield, etc.) The illumination LED may be repeatedly registered 115, for example, repeatedly registered in the same way as the control LED and the values may be integrated and/or averaged, for example, in the same way as the control LED. In this way, any drift of the illumination LED attributable due to, for example, power up or ambient temperature, should substantially match the drift of the control LED and the drift will thus be accounted for in any comparison of the light output values.

The registered light output of the illumination LED is compared 118 to the registered light output of the control LED. In embodiments where the light output values are integrated and/or averaged, the comparison 118 may be made using the integrated and/or averaged light output values. The illumination LED(s) will age at the same rate, and the control LED, being used only sporadically, will age at a negligible rate. The illumination LED may be compared 118 to a threshold value which is a percentage of the light output of the control LED. For example, the threshold value may be selected from a range such as 50%-70% of the light output of the control LED. The percentage value may be higher or lower than this range. It should be noted that comparison to a threshold value may be broadly construed to encompass any comparisons of the light outputs of the illumination LED and the control LED. For example, the light output of the illumination LED may be compared to the light output of the control LED, and the deviation compared to a threshold deviation. Other ways to perform such comparisons will be apparent in light of the present disclosure and are considered to be within the scope of the present disclosure.

The illumination LED may be registered 115 and compared 118 repeatedly during any particular operation period of the light fixture to determine end of life. If the comparison 118 results in a determination that the illumination LED light output is less than (or, in some embodiments, less than or equal to) the threshold value, the method 100 may include one or more additional steps. For example, an alarm may be activated 121. The alarm may be an audible alarm, a visual alarm, other alarm types, or combinations of more than one type of alarm. In another example, the light fixture is disabled.

Figure 3:
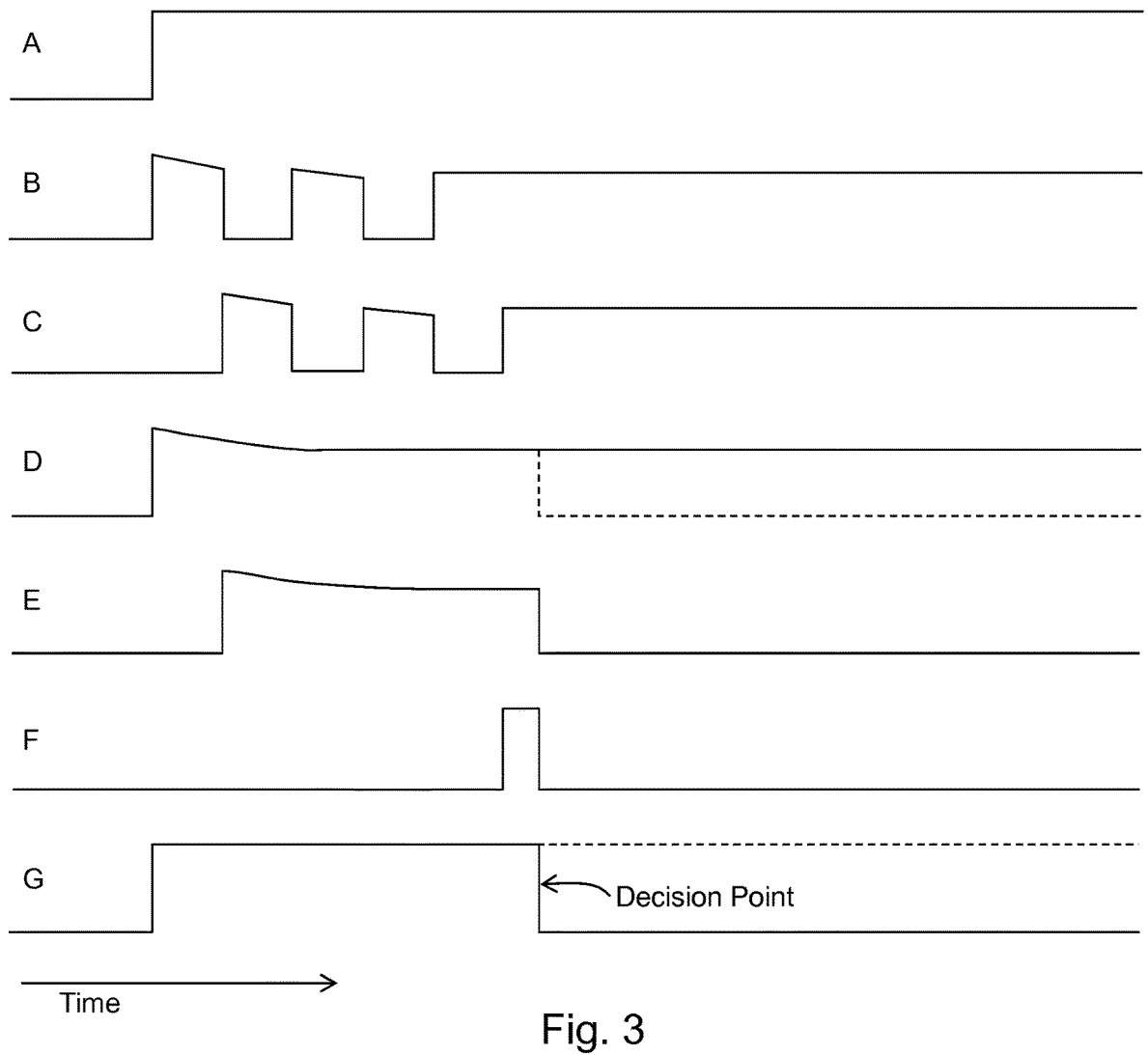
FIG. 3 is a timing diagram of exemplary embodiment of the presently disclosed method.

FIG. 3 depicts a timing diagram of an exemplary embodiment of the present disclosure showing the timing at power up or at a prescribed interval during use. Row A depicts power to the light fixture, row B is the drive of the illumination LED; row C is the drive of the control LED; row D is the integrated or average value of the light output of the illumination LED; row E is the integrated or averaged value of the light output of the control LED; row F is the timing of the compare operation; and row G is depicts the decision point for turning off the light fixture, flashing an indicator, etc. Drift of the light output (e.g., due to ambient conditions) and droop of the LED drive circuit (e.g., at power up) is exaggerated to show that the comparator method will compensate for each.

The disclosure may be embodied as an LED light fixture 10. It should be noted that the present disclosure is equally applicable to light fixtures having non-LED light sources that degrade over time. The light fixture 10 comprises a sensor 12, which may be, for example, a photo-diode. A control LED 14 is located proximate the sensor 12 such that the light output of the control LED can be detected (and registered) by the sensor 12. An illumination LED 16 is located proximate the sensor 12 such that the light output of the illumination LED 16 can be detected (and registered) by the sensor 12. The illumination LED 16 may be an LED used to provide functional light—i.e., light used for accomplishing the function of the light fixture 10. In other embodiments, the illumination LED 16 is used primarily for end of life determination (i.e., a reference LED) and is not configured to provide functional light. In some embodiments, the light fixture 10 comprises one or more additional illumination LEDs 18.

A comparator is provided. The comparator is in electrical communication with the sensor 12 and may further be in electrical communication with the control LED 14 and/or the illumination LED 16. The comparator is configured to compare the registered output of the illumination LED 16 to the light output of the control LED 14. As discussed above, the comparator may compare the light output of the illumination LED 16 to the light output of the control LED 14 (or to a threshold value based on a percentage of the light output of the control LED 14). Other comparisons will be apparent and within the scope of the present disclosure.

Figure 4:
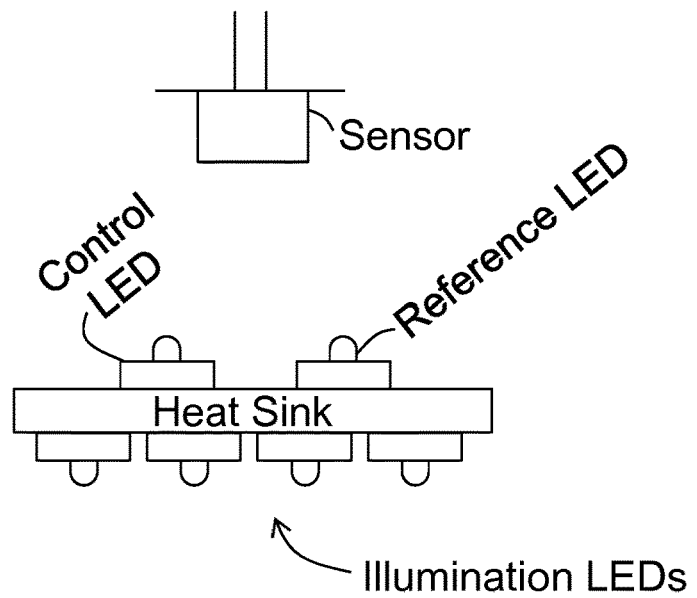
FIG. 4 is a diagram depicting a device according to another embodiment of the present invention.
Figure 5:
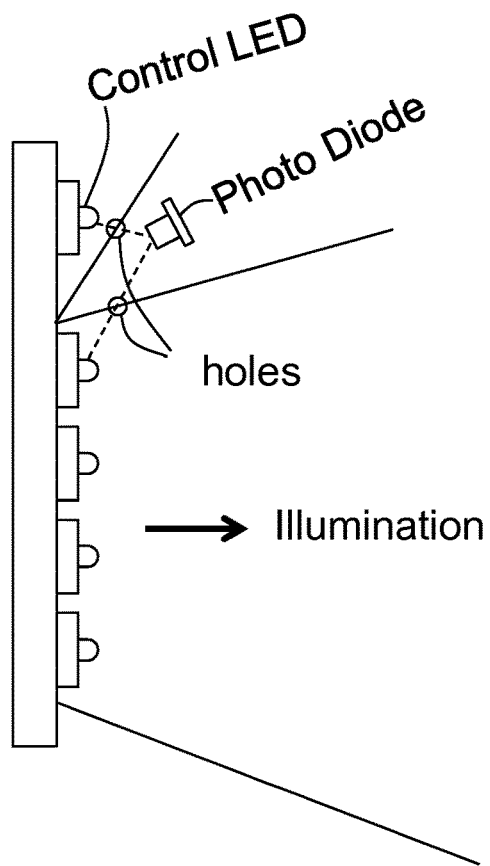
FIG. 5 is a diagram depicting a device according to another embodiment of the present invention.

FIG. 4 depicts another embodiment of a device of the present disclosure showing where the illumination LEDs may be mounted to the opposite side of a substrate (in this case, the substrate also acts as a heat sink) from a control LED and a reference LED (an LED which stays on along with the illumination LEDs). FIG. 5 depicts yet another embodiment of a device of the present disclosure showing the control LED and illumination LEDs mounted to a substrate and having optics such that the photodiode sensor will detect a light value of the control LED and illumination LED which is substantially equal when the LEDs are new.

Figure 6:
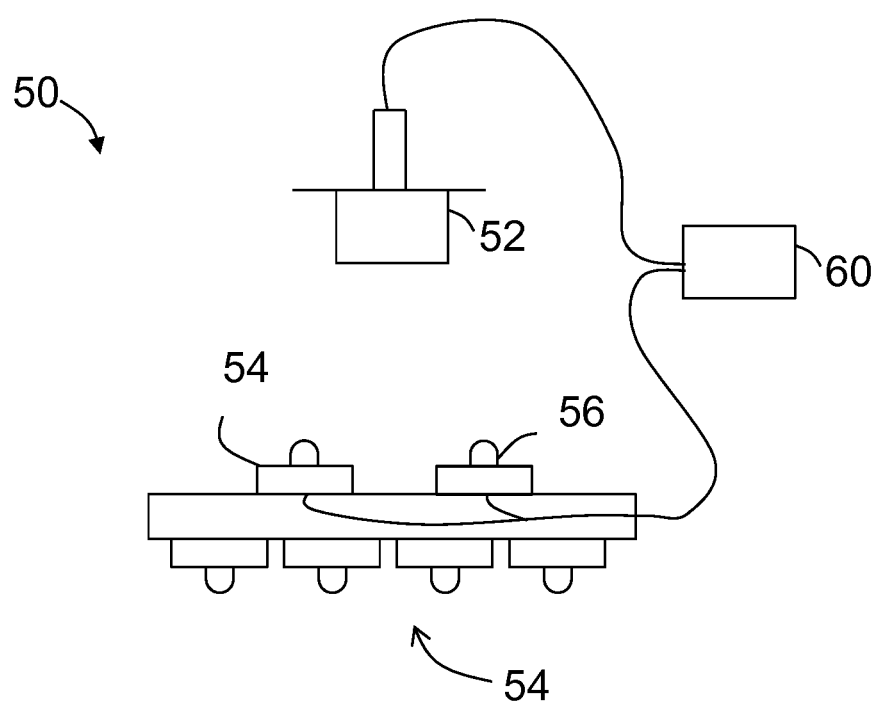
FIG. 6 is a diagram depicting a device according to another embodiment of the present invention.

In other embodiments, a light fixture 50 may comprise a sensor 52, a control LED 54, and an illumination LED 56, each in electrical communication with a controller 60, such as, for example, a microprocessor (see, e.g., FIG. 6). The controller 60 may be configured to execute any of the previously described methods. For example, where the controller 60 is a microprocessor, the microprocessor may be programmed to execute software and/or firmware which performs the steps of an aforementioned method. Other controllers 60 are known, and may include customized controllers such as, for example, FPGAs and ASICs.

Embodiments of the devices and methods of the present disclosure do not require software, thereby simplifying aircraft certification. End of life determination is made according to actual light level comparison, which will improve the accuracy of the determination. The logic used in the disclosed device is simple enough for discrete logic and analog circuitry without the need for software. However, software can be utilized based on the design of the system. Use of such a comparator method will inherently account for variations in LED light output drive (drift, droop) at power up, variations due to ambient conditions, drift of the sensor (e.g., photo diode), aging of the sensor, etc. As such, a persons skilled in the art will recognize that the scope of the disclosure includes embodiments of the invention implemented using, for example, processors, controllers, discrete components, software, firmware, etc., or combinations of these.

Figure 7:
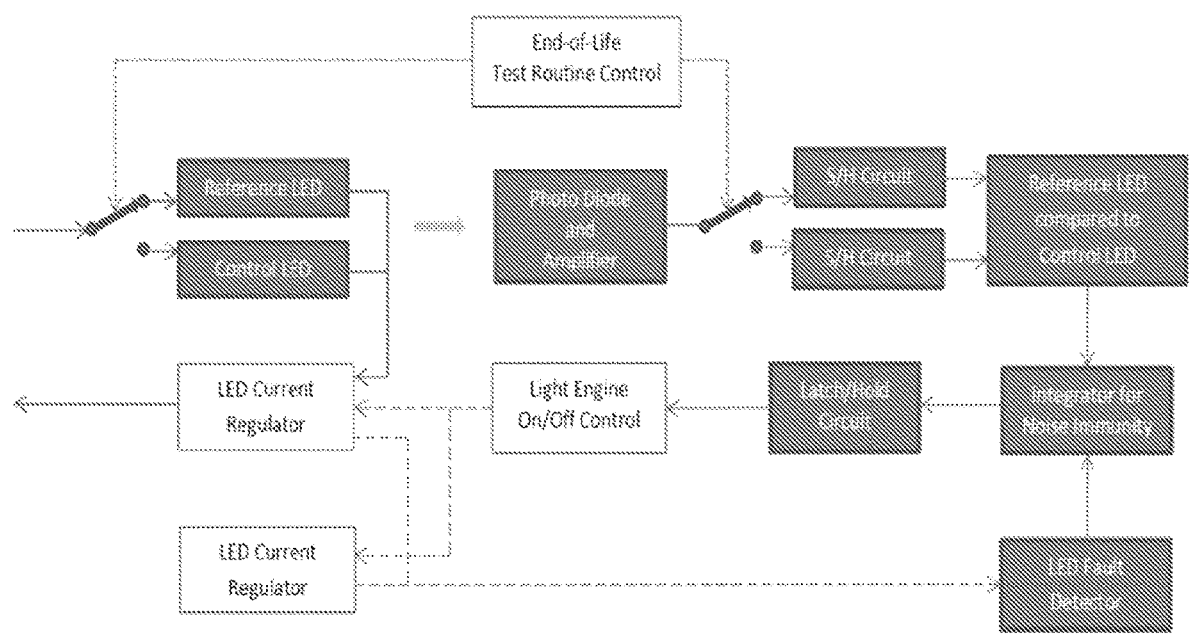
FIG. 7 is a diagram depicting a device according to another embodiment of the present invention.

In an exemplary embodiment of a device according to the present invention utilizing discrete circuits, a control LED is energized by the by a power circuit connected to the control LED by a switch (see, e.g., FIG. 7). A photodiode and amplifier measure the light output of the control LED and provide a measurement signal to a first sample and hold ("S/H") circuit. The switch is used to power an illumination LED with the power circuit (and turn off the control LED). The photodiode and amplifier measure the light output of the illumination LED and provide a measurement signal to a second S/H circuit. A comparator circuit receives the measurement signals from each of the first and second S/H circuits and compares the measurement signals. The output of the comparator is received by a latch and hold circuit which controls the power circuit of the light engine. If the comparator indicates that the light fixture has not degraded below the allowed level (i.e., that the illumination LED is not lower than a threshold value of the control LED), then the latch and hold circuit maintains power to the light engine of the light fixture. If the comparator indicates that the light fixture has reached EOL, the power circuit may be held off by the latch and hold circuit. Other embodiments of discrete circuits implementing the present invention will be apparent in light of the present disclosure.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of determining end of life of an LED light fixture, comprising the steps of:
   energizing a control LED;
   registering, using a sensor, the light output of the control LED;
   de-energizing the control LED;
   energizing an illumination LED;
   registering, using the sensor, the light output of the illumination LED; and
   comparing the output of the illumination LED to a threshold value based on the output of the control LED.

2. The method of claim 1, wherein the illumination LED is registered repeatedly while the illumination LED is energized.

3. The method of claim 1, wherein the illumination LED is one of a plurality of illumination LEDs.

4. The method of claim 1, wherein the control LED is energized for a predetermined period of time before being de-energized.

5. The method of claim 1, further comprising the step of activating an alarm if the output of the illumination LED is less than the threshold value.

6. The method of claim 1, further comprising the step of activating an alarm if the output of the illumination LED is less or equal to than the threshold value.

7. The method of claim 1, wherein the light sensor is a photo-diode.

8. An LED light fixture, comprising:
   a controller;
   an illumination LED in electrical communication with the controller and selectively operable;
   a control LED in electrical communication with the controller;
   a photo-diode configured to detect the output of the control LED and the output of one of the illumination LED; and
   wherein the controller is programmed to:
      receive an illumination signal;
      energize the control LED and detect the output of the control LED using the photo-diode;
      determine a threshold output level based on the output of the control LED;
      de-energize the control LED;
      energize the illumination LED;
      detect the output of one of the illumination LED using the photo-diode; and
      compare the output of the illumination LED to the threshold output value.

9. The LED light fixture of claim 8, wherein the threshold value is based on a percentage of the light output of the control LED.

10. The LED light fixture of claim 9, wherein the threshold value is selected from a range of values from 50%-70% of the light output of the control LED.

11. The LED light fixture of claim 8, further comprising an alarm.

12. The LED light fixture of claim 11, wherein the controller is further programmed to activate the alarm if the output of the illumination LED is less than the threshold output value.

13. The LED light fixture of claim 11, wherein the controller is further programmed to activate the alarm if the output of the illumination LED is less than or equal to the threshold output value.

14. The LED light fixture of claim 8, further comprising additional illumination LEDs.

15. The LED light fixture of claim 14, wherein the additional illumination LEDs are configured such that the output of the additional illumination LEDs is not detected by the photo-diode.

16. An LED light fixture, comprising:
   a photo-diode;
   a control LED proximate to the photo-diode such that the light output of the control LED is detectable by the photo-diode, and where the control LED is configured to operate for a pre-determined length of time;
   an illumination LED proximate to the photo-diode such that the light output of the illumination LED is detectable by the photo-diode, and wherein the illumination LED is configured to operate after operation of the control LED;
   a comparator configured to compare the detected output of the at least one illumination LED to a threshold value based on the detected output of the control LED.

17. The LED light fixture of claim 16, wherein the threshold value is based on a percentage of the light output of the control LED.

18. The LED light fixture of claim 17, wherein the threshold value is selected from a range of values from 50%-70% of the light output of the control LED.

* * * * *